June 21, 1955 R. G. BLONDÉ 2,711,443

PULSE CODE TRANSMISSION DEVICE

Filed Jan. 26, 1954 2 Sheets-Sheet 1

United States Patent Office 2,711,443

Patented June 21, 1955

2,711,443

PULSE CODE TRANSMISSION DEVICE

Robert Gaston Blondé, Paris, France, assignor to Societe Alsacienne de Constructions Mecaniques, Paris, France Application January 26, 1954, Serial No. 406,121

Claims priority, application France February 6, 1953

5 Claims. (Cl. 178—43.5)

The present invention relates to the distant transmission of intelligence by means of recurrent coded electric pulse groups, each pulse of which is characterized by one or the other of two possible signalling conditions, as, for instance its presence or its absence.

In the device of the present invention, as in other and known systems, a signal wave to be transmited, or "intelligence wave" generally consisting of an electric voltage continuously variable in time is transmitted by sampling the said wave at periodically recurring time instants to determine its instantaneous amplitude and by transmitting, for each one of the sampled amplitudes, a combination of an integer number $n$ of equal duration pulses individually having one or the other of the two possible signalling conditions, and thus constituting a "group of coded pulses." The number of possible different pulse combinations being restricted and at most equal to $2^n$, while the amplitudes to be represented may take an infinite number of different values, the representation of these amplitudes can be made only to a certain approximation. It is possible, for instance, to divide the possible range of variation of the sampled amplitudes into a predetermined number of intervals and have a particular interval correspond to each pulse combination. The composition of the corresponding group of coded pulses then expresses the fact that the sampled amplitude has its value in this interval.

Any coding device or "coder" used to translate sampled amplitudes into coded pulse groups, whatever its nature may be, should consequently generate the same group of pulses, whether the amplitude sampled lies in the middle of the corresponding interval or in the vicinity of one of its limits. In the latter case, it is fairly difficult to avoid coding errors, errors which are especially detrimental to the operation of the system, due to the fact that a single pulse with a wrong signalling condition causes the corresponding group to represent a completely different amplitude interval.

In order to obviate this drawback, there is used in certain known systems a so-called "quantizer" device associated with the coding device for applying to the said coder not the sampled amplitude itself, but a slightly different amplitude selected from a number of discrete values, always the same if the sampled amplitude belongs to the same interval, and for which the coder operates perfectly.

In other known devices the quantizer device is integral with the coding device.

The present invention more particularly relates to systems in which electron tube coding devices are used, for instance, electron tube coders of the type described in U. S. Patent 2,646,548 to J. A. Ville, P. A. Herreng and A. P. Pagès. These devices essentially comprise an electronic tube in which an elctron beam is projected on a collecting anode through an apertured electrode or "mask" comprising solid and apertured elements arranged in a row along a given direction in an order selected according to the chosen code. The scanning of a cut out element by the beam causes a pulse to be produced in the anode circuit, while no pulse is produced when a solid element is scanned.

In these devices two means are provided, in addition, for applying to the beam, in the said direction, two deflection motions which are superposed on each other. The first one imparts to the beam, consecutively to each sampled amplitude, a deflection proportional to the said amplitude and which is held constant during the second motion defined hereinafter and for a time approximately equal to that between two successive samplings. The other means is controlled by a periodic pulse generator of a basic frequency equal to the recurrence frequency of the pulse groups and applies to the beam a linear scanning motion with such an amplitude that the same beam scans on the mask a number $n$ of elements (cut out or not, according to the code selected for the construction of the coder tube and to the particular point from which the scanning starts).

It is clear that this scanning motion will generate in the anode circuit a group of coded pulses, some of which will actually be present and the others absent, but it is clear also that the exact time at which this group is generated will depend on the sampled amplitude, the scanning being effected from the initial position of the deflected beam, the initial impact of which may occur, for instance, at the junction of two elements of the mask or at the middle of an element. Further, in the latter case, if the starting point element of the mask corresponds to an aperture, the wave shape of the first produced pulse will be seriously affected thereby.

Calling T the duration of scanning of an element of the mask, which is equal to the duration assigned to each pulse in the coded group, the times of occurrence of the peaks of the pulses generated may therefore, according to the values of the sampled amplitudes, fluctuate in any manner inside a time interval T, i. e. offer, with respect to an average position, an advance or delay $\tau$, at most equal to $T/2$. As their timing and shape are liable to vary for the reasons just explained, the pulses generated by such a device cannot be immediately directed towards a transmission line or other utilization circuit unless their wave shape has first been corrected; i. e. they must be applied to a pulse shaping device, the functions of which are improving their wave shape and also ensuring them a proper timing with reference to predetermined recurrent fixed instants.

When such a pulse shaping device is used in the proper way, the coding device and the said shaping device should operate with the same periodicity and in synchronism. To this effect, both devices will, for instance, be controlled by recurrent "director" pulses of very short duration supplied by a so-called "basic frequency generator," eventually with interposing between the said generator and the two controlled devices of delay networks ensuring a correct sequence in time of the generating of the pulse groups and of the shape correction thereof.

Due to its control by the said director pulses, the pulse shaper will be operated at fixed times while, as explained above, the times at which the pulses to be corrected occur are fluctuating. There may thus result, due to the possible effective operating of the shaper at a time when a pulse to be corrected offers one of its edges instead of its peak, serious errors in the operation of the system.

To obviate this drawback, various "quantizer" devices are known. One of them, for instance, is described in the British patent specification 701,347 filed by the Société Alsacienne de Constructions Mécaniques. In the latter device, a special "grid" is provided in the coding tube and has as a function to compel the electronic beam to assume, before each scanning, a predetermined position such that its impact on the mask occur exactly between two elements of the said mask. There is thus provided in the tube, in front of the mask, an auxiliary metal grid the bars of which are located with respect to the said elements in such a way that the electron beam finds a stable starting position before scanning only when passing along the edge of one of the said bars, this being done with the help of a suitable auxiliary electric circuit.

It has been found, however, that if it is desired to operate the coder tube at a very high speed in such a circuit the practical realization of such a beam pre-locating device is difficult.

An object of the present invention is to avoid the necessity for using such a pre-locating device.

Another object of the present invention is, in a device for translating an intelligence wave by means of coded pulse groups, and comprising a coder tube in which an electron beam is projected on a collecting anode through an apertured electrode with cut out and solid portions arranged according to the code selected, and through an auxiliary grid, according to the above given description, the same device comprising in addition a pulse shaper of any known type, the said coder tube and pulse shaper being actuated in a periodically recurrent manner and after one another at predetermined instants, the insertion between the said coder tube and shaper of apparatus having as a function to decrease fluctuations in time, about their average recurrent position, of the time positions of the coded pulses applied to the shaper, fluctuations which result from the fact that the sampled signal amplitudes applied to the coder tube may assume an infinite number of values between given limits, while the coder can generate only a finite number of coded pulse groups of different composition.

It will be seen that, according to this principle, the maximum offset in time of the peak amplitude of a pulse applied to the shaper, measured from an average position for which the shaper is conveniently adjusted, may be decreased to $T/4$ instead of $T/2$, T being the duration of one pulse. A pulse offset by a quarter of the duration assigned to the complete pulse still offers, when the shaper operates, a sufficient amplitude (for instance of the order of half the peak amplitude) for the correct operation of the shaper, it being thus ensured that any pulse effectively present at the input to the shaper be never treated as an absent pulse.

According to the present invention, there is provided, in an electrical transmission system in which an intelligence wave is sampled for its instantaneous amplitude at periodically recurring time instants and in which the so successively sampled amplitudes are represented by recurring coded pulse groups, each of which comprises an integer number $n$ of pulses of equal durations but individually having one or the other of two possible signalling conditions, a translating device comprising an intelligence wave source, a basic frequency pulse generator, a sampling and storing device controlled by the pulses from the said generator and delivering a stepped electric voltage, the successive step levels of which are proportional to the said successively sampled amplitudes; an electron tube coder controlled by the said stepped electric voltage and by a periodic voltage derived from the said generator and delivering to a main circuit groups of coded pulses of constant duration but having fluctuating time relationship with respect to fixed reference instants corresponding to the occurrence of the pulses from the said generator; the said electron tube coder further including means for delivering to an auxiliary circuit groups of auxiliary pulses all of a same signalling condition and having a fixed time relationship with the said coded pulses; means for deriving from each of the said groups of coded pulses a first and a second group of coded pulses of identical composition but offset in time by a time interval equal to half the duration of one coded pulse; means controlled by pulses from both the said generator and auxiliary circuit for selecting from the said first and second derived groups that one which offers the smaller time offset with respect to the said fixed reference instants; a pulse shaper having input and output terminals and controlled by pulses from the said generator, means for impressing upon the said input terminals the pulses of the said selected pulse group and means for impressing the shaped pulses received at the said output terminals upon a utilization circuit.

According to another feature of the invention, auxiliary pulses generated by the scanning of the bars of the auxiliary grid of the coder tube by the electron beam are used for characterizing the exact position in time of the pulses of the coded group generated by the same scanning. The positions in time of these auxiliary pulses are compared with those of the director pulses controlling the scanning. This comparison makes it possible to discriminate whether the pulses are in advance or delayed with respect to their average time position. Finally, according to the result of this discrimination, either one or the other of the two coded groups offset in time is transmitted to the shaper and thereafter to a transmission line or other utilization circuit.

According to a preferred mode of embodiment of the device for applying the invention, each coded pulse group from the coder tube is applied to two delay networks the delays of which differ by one-half of the time interval assigned to each pulse in a coded group and the two derived groups thus offset are applied to two amplifiers controlled by electronic trigger circuit having two equilibrium positions, in such a manner that, according to the position of the said trigger circuit, one amplifier is blocked while the other one is in a working condition. The non-coded pulses, i. e. all present, generated in the auxiliary grid circuit of the coder tube by the scanning of the said grid are transformed by means of two rectifiers, a phase inverter and two clippers into two auxiliary groups of pulses of a same polarity and with a perfectly rectangular wave shape, but complementary in time, i. e. such that the peak flat portions of one of them exactly correspond to the intervals between the pulses of the other one. Each of the director pulses from the basic frequency generator which caused the generating of the coded and auxiliary pulse groups, after being delayed by a suitable time interval in a delay network, is applied in parallel to two amplifiers with amplitude thresholds, in each of which it is superposed on one of the two auxiliary groups of offset rectangular pulses, and the one in which the delayed director pulse appears during a peak flat portion of one of the rectangular pulses operates the said electronic trigger circuit to trip it (or possibly to hold it in the correct position if the latter was pre-existent owing to former operations) and to open, by unblocking one amplifier, a passage towards the shaper for that one of two derived coded pulse groups, offset by half the duration of one pulse with respect to one another, in which the positions of the pulses offer the smaller offset with respect to fixed reference instants corresponding to the optimum operation of the shaper.

The present invention will now be described in greater detail hereinafter with reference to the appended drawings illustrating an example of embodiment and wherein.

Figure 1:
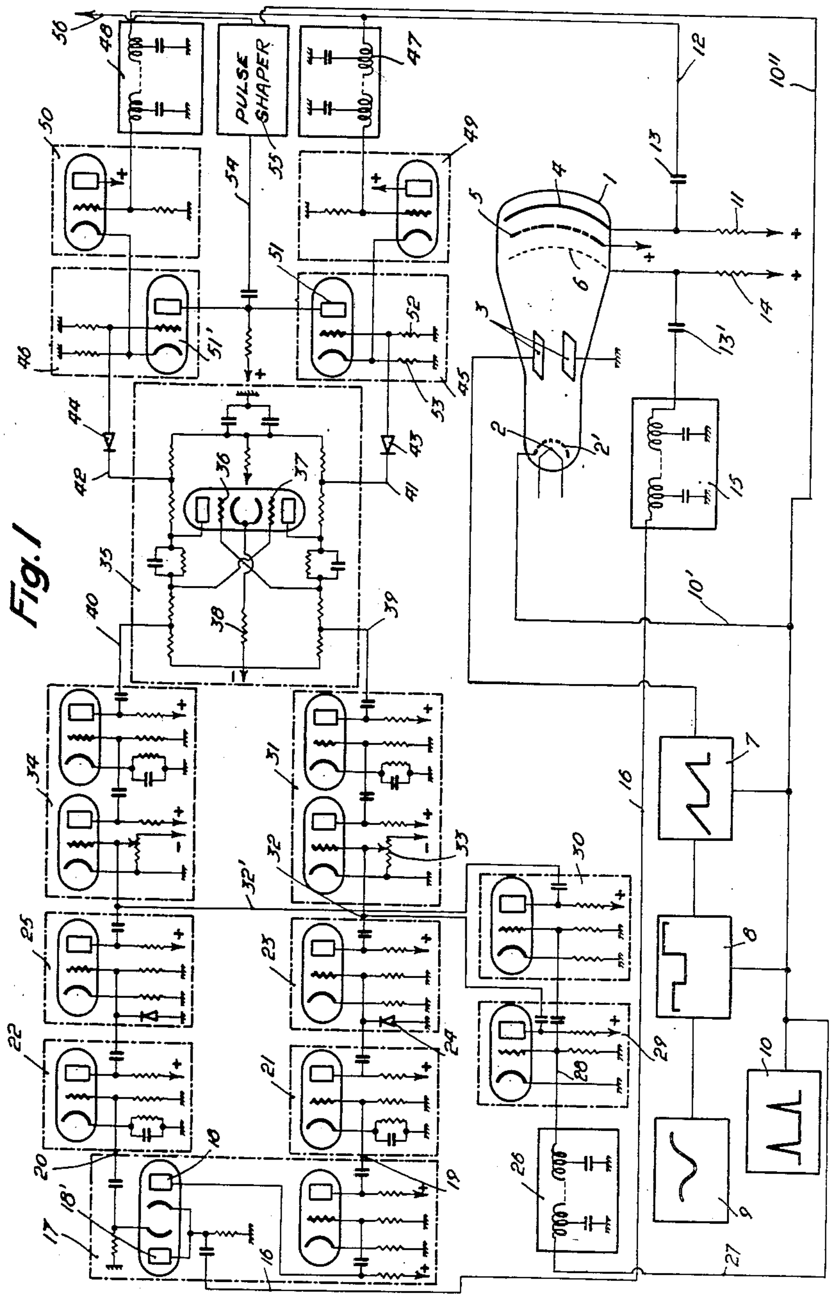
Figure 1 is a diagram of a device according to the invention.

The set up in Figure 1, comprising in combination a number of components which are already known per se, the diagram has been limited to the elements which are strictly indispensable for understanding the operation of the device. Thus, in particular, the sources are not shown which are used for the power supply of the electrodes of the electron tubes. There have been indicated, merely, for these sources, the connections to a point of constant potential, called a "ground" hereinafter, and the sign of the polarity of the source energizing the main electrodes, in particular the anodes of these electron tubes.

Figure 1 shows a coder tube 1 of the type described in the U. S. patent specification 2,646,548 already mentioned. This tube comprises an electron gun 2 producing an electron beam, a beam intensity control electrode 2' deflecting plates 3, a collector anode 4 and a perforated electrode or "mask" 5. This tube also comprises an auxiliary grid 6, set up in front of the said mask and the bars of which face the intervals between the elements of the mask, the word "elements" designating solid and apertured parts, as already explained. On the deflecting plates 3 are superposed two variable voltages, one of which is obtained from a saw tooth wave generator 7 synchronized by a basic frequency pulse generator 10 and the other one from a stepped wave generator 8 in which the successive levels of the steps are proportional to the instantaneous amplitudes successively sampled out of an intelligence wave from a signal source 9. The amplitude samplings and consequently the steps of the stepped wave are also synchronized by the director pulses from the pulse generator 10. The anode 4 of the tube is connected through a resistance 11 with a suitable voltage source. The pulses collected due to the scanning of the electrodes by the electronic beam at the terminals of resistance 11 are transmitted to the utilization circuit described later through a connection 12 and a coupling condenser 13. On Figure 1 there may also be seen a connection 10' connecting the pulse generator 12 with the beam intensity control electrode 2' of 1. The function of this connection is to ensure extinction of the beam during the time intervals during which the amplitude of the saw tooth wave delivered by 7 returns to zero, so as to avoid production of false coded signals during those time intervals.

The auxiliary grid 6 is similarly connected through a resistance 14 with a suitable voltage source and the "auxiliary" pulses picked up due to the scanning of the bars of that grid by the beam are transmitted through a condenser 13' to the input of a delay network 15, the output of which is connected through a connection 16 with the input to a set up 17 of a known type comprising essentially a double diode 18, 18', ensuring selection of the negative half waves of the auxiliary pulses which are obtained at 19 after reconversion into positive half-waves through a polarity inverter stage and of the positive half-waves which are directly obtained at 20. 21 represents a one stage amplifier of a conventional type and 22 an amplifier identical with 21.

23 represents a clipping amplifier, also of a conventional type, comprising, in particular, a rectifying element 24 clipping the signal applied and 25 represents a clipping amplifier identical with 23.

26 designates a delay network which delays the said auxiliary pulses before they are applied through 28 to two conventional amplifiers 29 and 30. 31 represents an amplifier with an amplitude threshold, also of a conventional type, to which are applied, in parallel, through 32, the signals clipped by the clipping amplifier 23 and the director pulses from 10 transmitted by the amplifier 29. It comprises, in particular, in the control grid circuit of its first tube, a potentiometer 33 making it possible to adjust the threshold level.

34 represents an amplitude threshold amplifier identical with 31. 35 represents a two-tube electronic trigger circuit, of the type called "bistable multivibrator," which it is not necessary to describe in detail due to its numerous known applications in the technique. It essentially comprises two tubes 36 and 37 which are coupled by a common cathode resistance 38 and by their control grid circuits, the crossed connections of which have the effect that the anode current variations of one tube act on the control grid of the other one in such a manner that one of the two tubes be always locked by the other one, and that, therefore, the trigger circuit has two stable positions, each one of them is characterized by the fact that one tube is conducting and the other one is locked. The trigger circuit comprises two input terminals 39 and 40 and two output terminals 41 and 42. The terminals 39 and 40 are respectively connected with the output terminals of the threshold amplifiers 31 and 34. The output terminals 41 and 42 are respectively connected through blocking rectifying elements 43 and 44 to two identical amplifiers 45 and 46 as will be set forth. 47 and 48 represent respectively two delay networks the input terminals of which are connected through 12 with the anode circuit of the coder tube I, and the output terminals of which are respectively connected with two amplifier stages 49 and 50.

The amplifier 45 comprises a single tube 51 the grid and cathode of which are respectively connected to ground through the resistances 52 and 53. The grid of this tube is further connected with the rectifying element 43 and the cathode with the output from the amplifier stage 49 (cathode output).

The amplifier 46 is connected in the same manner with the rectifier element 44 and the amplifier stage 50.

The anode circuits of the amplifiers 45 and 46 are common and the signals collected on the anodes are transmitted through 54 to a pulse shaping device of any known type 55 which will direct them, through all necessary elements, towards the transmission line 56 or other utilization circuit and eventually towards a receiving device.

The operation of the device of Fig. 1 will now be described with reference to both Figures 1 and 2. It has been assumed that the device represented was used in a sending assembly producing coded pulse groups comprising five pulses each. The operation of this sending assembly is controlled by short duration recurrent pulses from 10 as represented at A in Figure 2. The time intervals assigned to each one of the five pulses of a coded group are referenced 1, 2, 3, 4, 5 and the middle points of these intervals define the average reference times for the peaks of the pulses present in the group. It is convenient to provide between the groups standby time intervals referenced zero. It has been assumed, in the case of Figure 2, that the director pulses from generator 10 were generated during these standby intervals. These so-called "director" pulses, with a very short duration as compared with that of the coded pulses, are applied at 27 to the device of Figure 1. Each director pulse controls, as already explained and through 7 and 8, the operation of the coder tube 1 and the generating, by the said coder tube 1 of a group of five coded pulses. There is shown at B in Figure 2 such a group of coded pulses, selected in any manner out of the $2^5=32$ possible groups and collected at 12 at the output from the coder tube 1 in Figure 1. This particular group is characterized, on the one hand, by the presence of pulses of ranks 1, 3 and 4 (and by the absence of pulses of ranks 2 and 5), and, on the other hand, by the fact that the peaks of the pulses offer a substantial time offset with respect to the average reference times defined above. The causes of this offset, the effects of which the present invention is meant to obviate, have been clearly set forth above.

Figure 2:
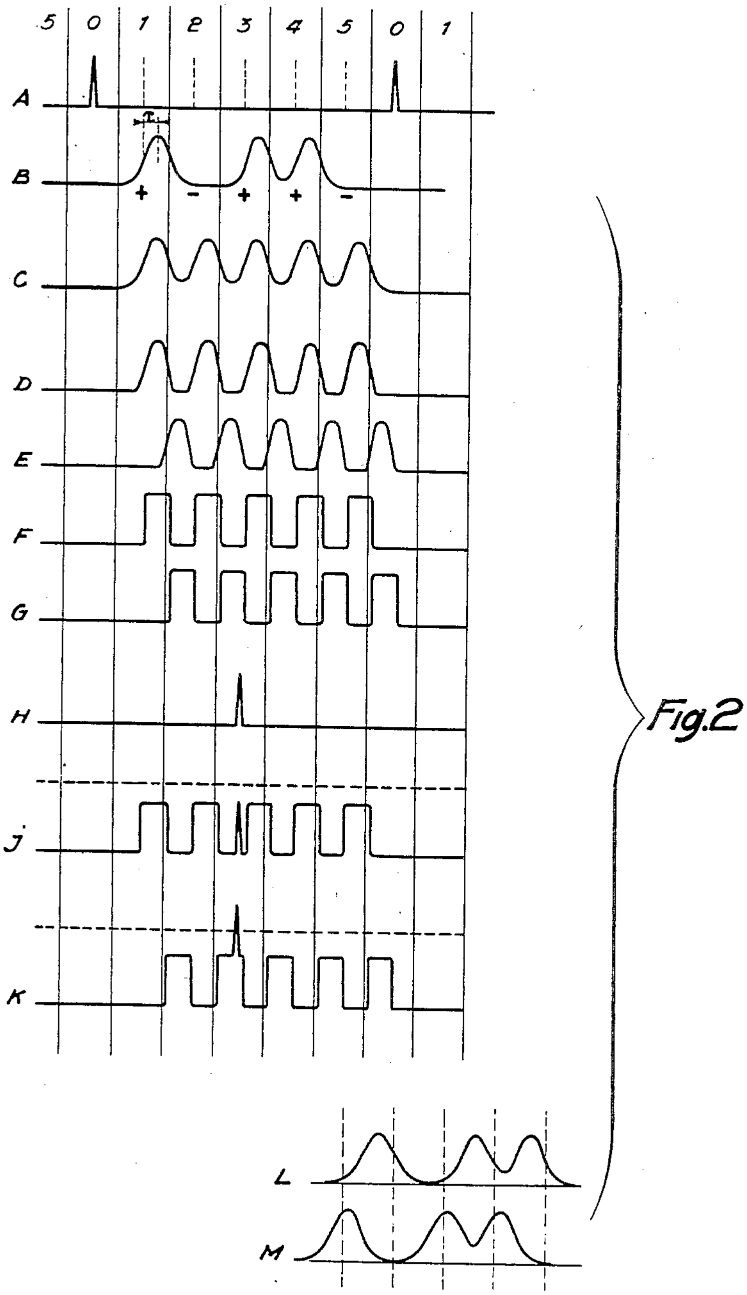
Figure 2 represents the wave shape of the signals which appear at particular points of the set up illustrated in the previous figure.

The wave shape of the auxiliary pulses received at 16 (Figure 1) is shown on line C of Figure 2. These pulses, five in number, all present, are generated by the scanning of five bars of the grid 6 by the electronic beam of tube 1, and are delayed by the delay network 15 which is dimensioned for exactly compensating the time difference which results from the fact that the bars of grid 6 cannot be placed facing the apertures of the mask 5, as they must let the beam pass through. The coded pulses collected at 12 and the auxiliary pulses, non-coded, collected at 16, respectively, represented as stated at B and C, will thus be perfectly synchronous. On lines D and E are represented, respectively, the pulse series derived from the said auxiliary pulses and received at 19 and 20. The pulses D, collected at 19 have preserved their positions in time, with respect to those represented at C. The pulses E collected at 20 are interleaved in time with respect to the former ones. F represents the rectangular pulses obtained at 32 which derive from the pulses D after they have been amplified by 21 and clipped by 23.

G similarly represents the rectangular pulses collected at the point 32′ which are derived from pulses E amplified in 22 and clipped in 25. H represents the director pulses collected at 28 after being delayed in 26. The delay of network 26 has been so chosen that these pulses occur exactly at the mean reference time for the third pulse of the coded groups, the particular choice of the third one or another one being arbitrary. These pulses are transmitted respectively by the amplifiers 29 and 30 to points 32 and 32′ where they are superposed respectively on the clipped pulses F and G. J and K represent the result of this superposition, while the horizontal dotted lines show the transmission thresholds of the amplitude threshold amplifiers 31 and 34. As represented in the case of Figure 2 only signal K exceeds the amplitude threshold. Thus no pulse will be collected at point 39 of the trigger circuit 35 while a pulse will be collected at point 40 of the said trigger circuit.

This pulse will cause tripping and locking of tube 36 and will make the tube 37 conducting (or will confirm this condition of the tube 37 if the trigger circuit was already in the corresponding position). Due to the conducting condition of the tube 37 and the non-conducting condition of the tube 36, points 42 and 41 will assume different potentials. The potential or point 41 is negative with respect to ground and the current flowing through the resistance 52 and through the rectifying element 43 blocks the tube 51. Conversely, as the potential of point 42 is positive, no current can flow through the rectifying element 44 and the tube 51 of amplifier 46 remains conducting.

In Figure 2, there are shown on lines L and M, two groups of coded pulses derived from the coder tube. The operating times of the shaper 55 have also been shown as vertical broken lines. The group represented on line L was collected at 12, delayed in the delay network 47, amplified in the amplifier 49 and applied to the input of the blocked amplifier 45. The network 47 imparted it a sufficient delay so that it does not occur before the trigger circuit 35 has operated and the amplifier 45 is blocked. The group represented by L was therefore not transmitted. The pulse group collected at 12, further, is applied to the amplifier 50 through the delay network 48. The delay of this network differs from that of the network 47 by a time exactly equal to half the time interval assigned to an elemental pulse in a group. The group M is amplified by the amplifier 46 which, unlike the amplifier 45 is not blocked by the trigger circuit 35. It is therefore transmitted by 54 to the pulse shaper 55 and the amplitudes of the present pulses are close to their peak amplitudes at the times of operation of the pulse shaper, shown by dotted lines.

On Figure 1 there may be seen a connection 10″ connecting the basic frequency generator 10 with the pulse shaper 55. The function of this connection is to ensure proper synchronism between the operation of 55 and that of 10, eventually after frequency multiplication of the director pulses issued from 10, as the frequency of the latter is normally equal to the recurrence frequency of the coded groups, while the shaper 55 must operate once for each of the *n* pulses in such a group.

It will be seen that according to the amplitudes values sampled and the fluctuations in delay or advance resulting therefrom in the generating of coded pulse groups, the device directs to the pulse shaper 55 one or the other of the two derived groups represented at L and M. In the case of Figure 2, it has been assumed that the group B is retarded and that consequently, it is the derived group M in advance with respect to group L which is transmitted. If, on the contrary, the pulse groups were in advance, it is the delayed group L which would have been transmitted, due to the converse position assumed by the trigger circuit 35. The automatic choosing, by the device of that one of the two derived groups which has the most favorable position in time thus ensures that the time fluctuation of the pulse groups transmitted to the shaper 55 are decreased, and that, according to the main object of the invention, the risk of errors in the transmission by this shaper of the coded pulse groups to the utilization circuit 56 is suppressed.

I claim:

1. In an electrical transmission system in which an intelligence wave is sampled for its instantaneous amplitude at periodically recurring time instants and in which the so successively sampled amplitudes are represented by recurring coded pulse groups, each of which comprises an integer number *n* of pulses of equal durations but individually having one or the other of two possible signalling conditions, a translating device comprising an intelligence wave source, a basic frequency pulse generator, a sampling and storing device controlled by the pulses from the said generator and delivering a stepped electric voltage, the successive step levels of which are proportional to the said successively sampled amplitudes; an electron tube coder controlled by the said stepped electric voltage and by a periodic voltage derived from the said generator and delivering to a main circuit groups of coded pulses of constant duration but having fluctuating time relationship with respect to fixed reference instants corresponding to the occurrence of the pulses from the said generator; the said electron tube coder further including means for delivering to an auxiliary circuit groups of auxiliary pulses all of a same signalling condition and having a fixed time relationship with the said coded pulses; means for deriving from each of the said groups of coded pulses a first and a second group of coded pulses of identical composition, but offset in time by a time interval equal to half the duration of one coded pulse; means controlled by pulses from both the said generator and auxiliary circuit for selecting from the said first and second derived groups that one which offers the smaller time offset with respect to the said fixed reference instance; a pulse shaper having input and output terminals and controlled by pulses from the said generator, means for impressing upon the said input terminals the pulses of the said selected pulse group and means for impressing the shaped pulses received at the said output terminals upon a utilization circuit.

2. A device as claimed in claim 1, wherein the said electron tube coder includes an electron tube with an apertured electrode comprised of solid and apertured elements arranged in a row along a given direction and in an order corresponding to the chosen code, means for forming an electron beam, an auxiliary metal grid placed in front of the said electrode and including bars facing the intervals between the said elements, means for projecting the said electron beam through the said electrode and grid, deflector plates for deflecting the said beam in the said given direction and a collector anode for collecting the electrons of the said beam; the said coder further comprising the said main circuit connected with the said anode and the said auxiliary circuit connected with the said grid; the said main and auxiliary circuit respectively receiving coded and auxiliary pulses from the said tube; and means controlled by the said generator for impressing upon the said deflecting plates the said stepped voltage wave and a saw tooth periodic voltage controlled by the pulses from the said generator.

3. A device as claimed in claim 1, wherein the said means for deriving from each group of coded pulses a first and a second group of pulses offset in time comprises two delay networks the propagation times of which differ by half the duration of one coded pulse.

4. A device as claimed in claim 1, wherein the said means for selecting from the said derived groups that one offering the smaller time offset with respect to the said fixed reference instants comprises a first and a second amplifier alternately blocked or made operative under the simultaneous control of director pulses from the said generator and of the said auxiliary pulses.

5. A device as claimed in claim 4, wherein the said selecting means further comprise a condenser for translating the said auxiliary pulses into bipolar pulses, a pair of rectifying diodes and a phase inverter for separating the positive and negative half-waves of the said bipolar pulses, and for deriving therefrom two series of pulses of same polarity in interleaved time relationship; the said first and second amplifiers each respectively including a threshold stage made operative under the simultaneous control of the said director pulses and of one of the said series of pulses.

References Cited in the file of this patent

UNITED STATES PATENTS

| | | |
|---|---|---|
| 2,537,843 | Meacham | Jan. 9, 1951 |
| 2,646,548 | Ville et al. | July 21, 1953 |